United States Patent Office 3,826,784
Patented July 30, 1974

3,826,784
NOVEL REACTIVE CINNAMATE POLYMERS
Masato Satomura, Saitama, Japan, assignor to Fuji Photo Film Co., Ltd., Kanagawa, Japan
No Drawing. Filed July 6, 1973, Ser. No. 377,006
Claims priority, application Japan, Aug. 18, 1972, 47/82,117
Int. Cl. C08f *3/62, 15/02, 15/16*
U.S. Cl. 260—47 UA
9 Claims

ABSTRACT OF THE DISCLOSURE

Reactive polymers having monomer units represented by the following general formula:

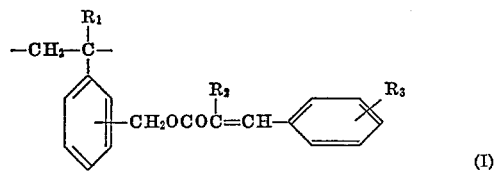

(I)

wherein $R_1$ represents a hydrogen atom or an alkyl group having not more than 2 carbon atoms, $R_2$ represents a hydrogen atom, cyano group, or a carbamoyl group, and $R_3$ represents a hydrogen atom, a halogen atom, a nitro group, an acyl group or an alkoxy, e.g., methoxy group.

BACKGROUND OF THE INVENTION

Field of the Invention

The present invention relates to novel reactive polymers having a monomer units represented by the following general formula (I):

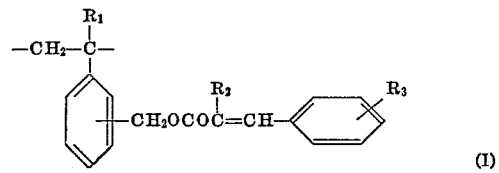

(I)

wherein $R_1$ represents a hydrogen atom or an alkyl group having not more than 2 carbon atoms, $R_2$ represents a hydrogen atom, cyano group, or a carbamoyl group, and $R_3$ represents a hydrogen atom, a halogen atom, a nitro group, an acyl group or an alkoxy, e.g., methoxy group, alone or together with another monomer.

Description of the Prior Art

Heretofore, a polymer having an ester group of an $\alpha,\beta$-unsaturated carboxylic acid as in the present invention have been known in the field of making light-sensitive polymers. However, these synthesizing processes mainly utilize a polymer reaction between, e.g., a polymer having hydroxy groups and cinnamoyl chloride (see, for example, J. Kosar, "Light Sensitive Systems," John Wiley & Sons, New York, 1965).

However, in processes utilizing a polymer reaction, it has been difficult to select the reaction solvent and its amount or to establish reaction conditions, including the reaction temperature, and, in addition, there are the defects that since the reaction is often conducted in a heterogeneous system or the reaction system is liable to become heterogeneous with the progress of the reaction, the reaction operations are difficult and a reactive polymer at high yield is difficult to obtained.

Further polymers utilizing a monomer having a cinnamic acid ester group, known before the application of the present invention, are well known and are produced by processes such as:

(1) Polymerizing vinyl cinnamate (Makromol. Chem., *37*, 46, 60, 89, Kogyo Kagaku Zasshi., *73*, 2356 (1970)).
(2) Polymerizing the compound of the formula:

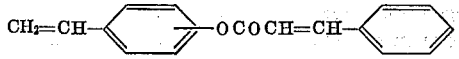

However, process (1) has the defect that during polymerization side reactions take place in addition to the vinyl polymerization and, as a result, the product is gelled to such an extent that high molecular substances insoluble in organic solvents result.

Further, process (2) involves a complex monomer synthesis since vinyl phenol is used as a starting material for the production of the monomer (vinyl phenol) is synthesized as follows:

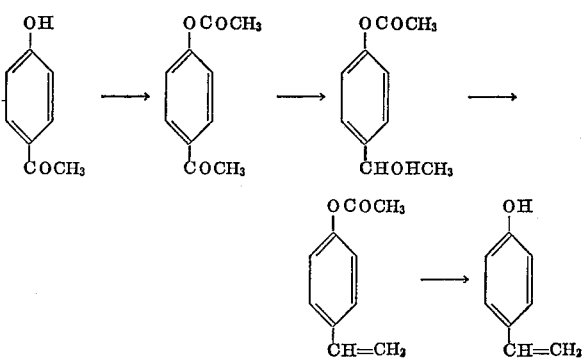

In addition, obtaining a cinnamic acid derivative from a cinnamic acid salt as in the present invention is difficult to achieve with this process because an esterification reaction utilizing phenolic hydroxy group is conducted. (The phenolic hydroxy group is less reactive than an aliphatic hydroxy group to the esterification reaction.)

Furthermore, in the polymerization of the monomer represented by the following formula:

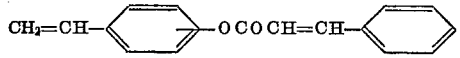

the polymerization process is limited to an ionic polymerization process because a radical polymerization of the monomer would provide a polymer having a comparatively low viscosity or else gelation would proceed.

Noting the fact that in the case of polymerizing a vinyl monomer containing a cinnamic acid ester the compound used in process (1) takes the following transition state:

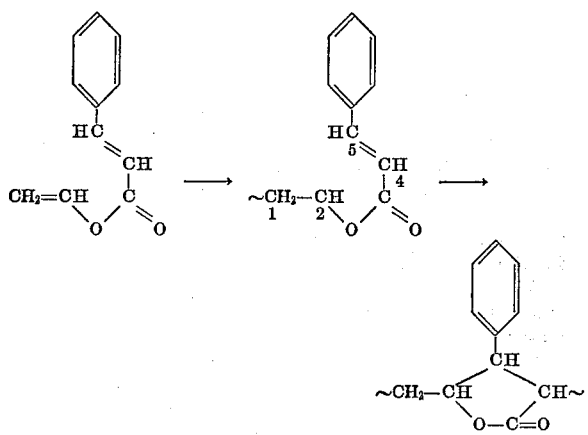

and that the side reaction of bonding the $C_2$ with the $C_5$ to form a stable 5-membered ring is liable to occur, the inventor considered that polymerizing a vinyl monomer which forms a 5-membered ring structure only with difficulty during the polymerization might provide a polymer soluble in solvents and, as a result, he reached the present invention.

SUMMARY OF THE INVENTION

The present invention relates to a novel polymer having an $\alpha,\beta$-unsaturated carboxylic acid ester group containing an aromatic nucleus at the $\beta$-position represented by the general formula (I) below, either alone or together with another monomer,

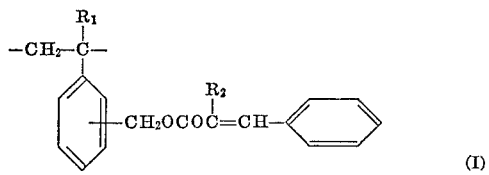

(I)

wherein $R_1$ represents a hydrogen atom or an alkyl group having not more than 2 carbon atoms, $R_2$ represents a hydrogen atom, cyano group, or a carbamoyl group, and $R_3$ represents a hydrogen atom, a halogen atom, a nitro group, an acyl group or an alkoxy, e.g., methoxy group.

Preferred of such polymers are those where bonding to either benzene ring is at the meta or para position.

DETAILED DESCRIPTION OF THE INVENTION

As the monomer capable of being copolymerized with the monomer of the present invention, there are illustrated, for example, styrene, chloromethylstyrene, hydroxymethylstyrene, $\alpha$-methylstyrene, chloromethyl-$\alpha$-methylstyrene, acrylic acid, acrylic acid amide, acrylic acid ester (such as methyl, ethyl, butyl, hydroxyethyl, methoxybutyl), methacrylic acid, methacrylic acid amide, maleic anhydride, methacrylic acid ester (such as methyl, ethyl, butyl, hydroxyethyl, methoxybutyl), vinylmethylimidazole, vinyl pyridine, vinyl pyrrolidone, vinyl acetate, vinyl propionate and the like. The content of such monomers is not particularly limited but, needless to say, if insufficient of the polymer units of the present invention are present the insolubilizing effect will be insufficient. Accordingly, generally at most 95 mol percent of such another monomer will be present in a copolymer, and more preferably less than 90 mol percent of such another monomer will be used.

Typical of the ester type materials heretofore recited are esters such as the lower alkyl esters, e.g., methyl esters.

Since the monomer of the present invention contains a vinyl or vinylidene group connected to a benzene ring, an ionic (i.e., cationic or anionic) polymerization process or a radical polymerization process, utilized in the polymerization of styrene or $\alpha$-methylstyrene, can advantageously be utilized.

The following two processes can be used to synthesize the vinyl monomer used in the invention:

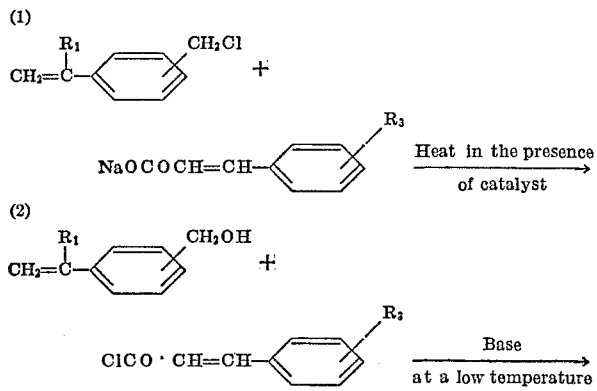

Either process can be used but, in the case of using nitrocinnamic acid, $\alpha$-cyanocinnamic acid, dichlorocinnamic acid, $\alpha$-carbamoylcinnamic acid, etc., where a pure corresponding acid chloride is difficult to obtain, process (1) is particularly effective.

Furthermore, chloromethylstyrene, one of the starting materials in the present invention, is prepared, for example, as follows:

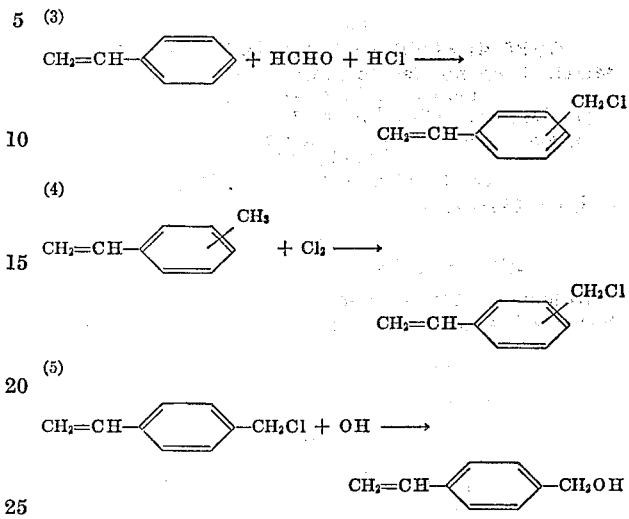

Therefore, the process of the invention is also advantageous from the viewpoint of synthesizing the monomer (styrene, vinyl toluene and chloromethylstyrene are commercially available), The vinyl monomer used in the invention provides a highly polymerized polymer having a viscosity as high as $[\eta]=0.38$ (in methyl ethyl ketone at 30° C.) by a rapid polymerization even when a radical polymerization initiator is used, and provides the effect of forming no insoluble by-products. In addition, it has been found that the resulting polymer undergoes a cross-linking reaction in the presence of photoactivating agent upon irradiation with light from a high pressure mercury lamp or xenon lamp to become insoluble in solvents. Thus, the resulting polymer can be mixed with a photoactivating agent such as is useful for well known cinnamate polymers, applied to support and used in a any process wherein a cross-linking reaction upon irradation with light is required, for instance, in fields where the cinnamate polymers are used. The conditions of use are basically the same as those used for the cinnamate polymers.

Specific examples of such photoactivating agents are 5-nitroacenaphthene, N,N'-dimethylaminobenzophenone, 4-nitronaphthyl cinnamamide, 4-furanacrylamino-1-nitronaphthalene, 4 - nitro-1-acetoamido-naphthalene, benzanthraquinone, etc.

For example, 1 g. of a polymer in accordance with the present invention (from Example 1) and 5-nitroacenaphthene (50 mg.) were dissolved in methyl ethyl ketone (6 ml.). This solution was overcoated on an aluminum plate using coating rod No. 26. After drying, this sensitive plate was covered with a transparent nega film and irradiated with a 450 w. high pressure mercury lamp from a distance of 25 cm. for about 4 minutes. Then this plate was treated with a methyl ketone-hydrophobic dye solution. The irradiated parts were dyed and distinguished from background. Thus, the material are useful as image forming elements.

The polymers produced in accordance with the present invention are easily formed at a temperature, depending upon the initiation temperature of the catalyst used and the solvent, of from about −78° C. to about 80° C., with reaction typically being at atmospheric pressure, though sub- or super atmospheric pressures can be used (with appropriate equipment) if desired. The reaction is usually completed in a time of from about 1 minute to about 10 hrs. according to the catalyst used (generally a radical catalyst), with lower temperatures requiring longer times and higher temperature requiring lesser times.

Ionic catalysts can be used as they are very active and the time required for the polymerization is very short, even at a temperature as low as −78° C., e.g., sometimes 5 minutes is enough to obtain the polymer. However, the activity of ionic catalyst is very susceptible to moisture, i.e., moisture in the air often decays the activity of such a catalyst, and an ionic polymerization reaction system must thus be kept free from moisture.

The radical catalysts are generally active at high temperature, except for the redox catalysts. For example, azobis compounds are broken into 3 parts following the reaction scheme:

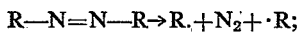

whereas redox catalysts yield radical specie following the scheme:

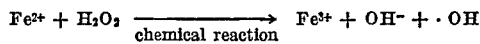

The resulting ·OR and R· are true active species of the radical catalyst. Their activity is not effected by moisture, e.g., a radical polymerization proceeds even in water. However, as cleavage of a radical catalyst (azo compound, α-diketo compound, peroxide, etc.) to form active radicals is slow, the temperature is usually raised and the time (30 minutes to ca. 10 hrs.) required is long as compared with the use of ionic polymerization catalysts.

The selection of the catalyst can be freely made by one skilled in the art, though ionic catalysts and radical catalysts are generally used.

Representative of the catalysts or initiators used are boron trifluoride, boron trifluoride etherate, aluminum chloride, zinc chloride, azobisbutyronitrile, azobisisobutyrovaleronitrile, benzoyl peroxide, hydrogen peroxide-sodium hydrosulfite etc. They are most preferably used in an amount of from about 0.05 to about 5 mol percent, based on the monomer(s).

A solvent can be used if desired, and generally speaking a solvent permits reaction to be conducted more smoothly. From 0 to about 500 mol percent of solvent, based on the monomer, is generally used. Typical of the solvents used are methylene chloride, carbon tetrachloride, benzene, toluene, methylethylketone, tetrahydrofuran, chlorobenzene, dimethoxyethane, β-ethoxyethyl acetate, anisole, acetophenon and the like.

When a copolymer is to be formed with another monomer as heretofore discussed, the rate of incorporation is god and the other monomer which is to be copolymerized will be used in an amount generally equivalent to that desired in final polymer. If the polymerization is continued until all the monomer present in a reaction vessel is consumed, the monomers are incorporated stoichiometrically into the polymer. If the reaction time is interrupted prior thereto the ratio of co-monomer incorporated into the polymer is defined by the monomer reactivity ratio. Example of producing a monomer:

Chloromethylstyrene (0.11 mole) and sodium cinnamate (0.12 mole) were dissolved in 30 ml. of dimethylformamide, and a small amount (about 5 weight percent to monomer) of a polymerization inhibitor (hydroquinone) and a small amount (about 2 weight percent to cinnamate) of a quaternary salt of trimethylbenzylammonium chloride as a catalyst were added thereto. The resulting solution was maintained at 100° C.–130° C. for 9 hours at atmospheric pressure while stirring. With the progress of the reaction, the precipitation of sodium chloride was observed.

The reaction solution was poured into water, and an organic layer was separated out and subjected to extraction using benzene as an extracting solvent, and after washing with water to neutrality in a conventional manner, the extract was dried using anhydrous magnesium sulfate. After the removal of the solvent (benzene), liquid-liquid extraction was conducted using petroleum ether to separate the ester at 40–60° C., which was then isolated using a liquid chromatograph where silica gel was used as the carrier and acetone as the solvent.

The eluate was analyzed by gas chromatography. When the eluate was analyzed using a programmed temperature gas chromatograph (20° C.–350° C.) the absorption of the starting material was not observed. From a comparison with the infrared spectra and NMR spectra of benzyl cinnamate, styrene, etc., it was proper to assign the following structural formula to the product:

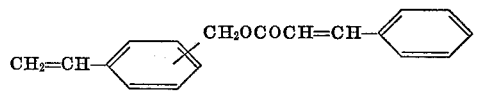

Yield about 80%. (NMR: 5.1 p.p.m. —HC$_2$—; IR: 1160, 1705 cm.$^{-1}$.)

EXAMPLE 1

4 grams of cinnamoyloxymethylstyrene (mixture of m- and p-derivatives thereof (molar ratio about 1:2) and 6 g. of methyl methacrylate were dissolved in 10 ml. of methyl ethyl ketone and, after replacing air with nitrogen (oxygen gas retards radical polymerization) gas, the polymerization reaction was effected, i.e., a small amount (about 1 weight percent) of azobisisobutyrovaleronitrile was added to the solution as a polymerization initiator and the solution was heated at 65° C. for 3 and a half hours while stirring at atmospheric pressure. The reaction system gradually became viscous, and was poured into methanol to separate the product. The viscosity of the resulting product measured at 30° C. using methyl ethyl ketone as a solvent was 0.38. No insoluble portion was detected. Therefore, it was confirmed that the side reactions of cross-linking or cyclization scarcely occurred.

NMR spectrum of the polymer showed the absorbance of the benzene ring.

EXAMPLE 2

While Example 1 showed an example of a copolymerization, this example shows an example of a homopolymerization.

3 grams of cinnamoyloxymethylstyrene (mixture of m- and p-derivatives thereof) was dissolved in 3 g. of methyl ethyl ketone, and the solution was maintained at 62° C. for 3 and a half hours under a nitrogen atmosphere at atmospheric using a small amount of azobisisobutyronitrile (2 wt. percent) as a polymerization initiator. Thereafter, the reaction solution was gradually poured into methanol to separate the product. The product was obtained in about 30% yield. The viscosity [η] measured in methyl ethyl ketone at 30° C. was 0.17.

EXAMPLE 3

2 grams of cinnamoyloxymethylstyrene (mixture of m- and p-derivatives thereof ratio about 1:2) and 2 g. of styrene were dissolved in 5 g. of methyl ethyl ketone, and the solution was maintained at 62° C. for 2 and a half hours at atmospheric pressure under a nitrogen atmosphere using 4 mole percent of azobisisobutyronitrile to monomer as a polymerization initiator. The system became so viscous that the system was diluted 1× with dimethylacetamide and then poured into methanol to separate the product. There was obtained about 1.3 g. of the product. The viscosity of the product, [η], in methyl ethyl ketone at 30° C. was 0.12.

While the invention has been described in detail and with reference to specific embodiments thereof, it will be apparent to one skilled in the art that various changes and modifications can be made therein without departing from the spirit and scope thereof.

What is claimed is:

1. A reactive polymer which comprising monomer units represented by the following general formula:

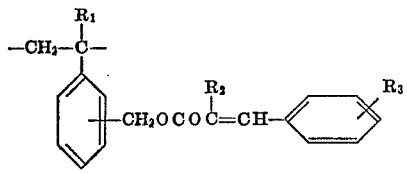

wherein $R_1$ represents a hydrogen atom or an alkyl group having not more than 2 carbon atoms, $R_2$ represents a hydrogen atom, a cyano group, or a carbamoyl group, and $R_3$ represents a hydrogen atom, a halogen atom, a nitro group, an acyl group or an alkoxy group.

2. A reactive polymer as claimed in Claim 1 comprising at least 5 mol percent of said monomer units.

3. A reactive polymer as claimed in Claim 2 comprising more than 10 mol percent of said monomer units.

4. A reactive polymer as claimed in Claim 1 when the monomer units are of the formula:

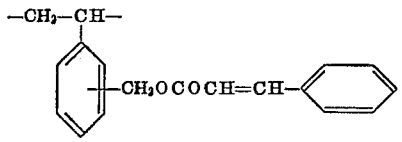

5. A reactive polymer as claimed in Claim 2 wherein the balance of the monomer units in the polymer comprise a monomer selected from the group consisting: styrene, chloromethylstyrene, hydroxymethylstyrene, α-methylstyrene, chloromethyl - α - methylstyrene, acrylic acid, acrylic acid amide, acrylic acid ester, methacrylic acid, methacrylic acid amide, maleic anhydride, methacrylic acid ester, vinylmethylimidazole, vinyl pyridine, vinyl pyrrolidone, vinyl acetate and vinyl propionate.

6. A reactive polymer as claimed in Claim 1 which is a homopolymer.

7. A reactive polymer as claimed in Claim 1 having a viscosity $[\eta]$ of greater than about 0.01 (at 30° C. in methyl ethyl ketone).

8. A reactive polymer as claimed in Claim 7 where the viscosity, same basis, is up to about 0.38.

9. A reactive polymer as claimed in Claim 1 where the alkoxy group is methoxy.

References Cited

UNITED STATES PATENTS

| | | | |
|---|---|---|---|
| 2,572,557 | 10/1951 | Butler | 260—89.3 |
| 2,725,372 | 11/1955 | Minsk | 260—89.3 |
| 3,073,862 | 1/1963 | Abramo et al. | 260—89.3 |
| 3,186,968 | 6/1965 | Fertig et al. | 260—86.1 R |
| 3,528,951 | 9/1970 | Kohn et al. | 260—78.5 N |

HARRY WONG, JR., Primary Examiner

U.S. Cl. X.R.

96—115 R; 117—132, 161; 204—159.14, 159.19; 260—32.8 R, 32.8 N, 77.5 BB, 78.4 N, 78.5 R, 78.5 N, 86.1 R, 86.1 N, 86.1 E, 86.3, 86.7, 89.3